United States Patent
Sripathan et al.

(10) Patent No.: US 10,277,463 B2
(45) Date of Patent: Apr. 30, 2019

(54) SYSTEM AND METHOD FOR SYNCHRONIZING COMPUTING PLATFORMS

(71) Applicants: Jayashree Sripathan, Bangalore (IN); Kavitha Sridhar, Bangalore (IN)

(72) Inventors: Jayashree Sripathan, Bangalore (IN); Kavitha Sridhar, Bangalore (IN)

(73) Assignee: Wipro Limited, Bangalore (IN)

(*) Notice: Subject to any disclaimer, the term of this patent is extended or adjusted under 35 U.S.C. 154(b) by 756 days.

(21) Appl. No.: 14/754,356

(22) Filed: Jun. 29, 2015

(65) Prior Publication Data

US 2016/0277231 A1    Sep. 22, 2016

(30) Foreign Application Priority Data

Mar. 18, 2015  (IN) .......................... 1317/CHE/2015

(51) Int. Cl.
*G06F 15/16* (2006.01)
*H04L 12/24* (2006.01)

(52) U.S. Cl.
CPC ............................. *H04L 41/0883* (2013.01)

(58) Field of Classification Search
CPC ........... G06F 9/45558; G06F 2212/152; G06F 21/57; G06F 2201/865; G06F 8/61; G06F 9/441; G06F 2201/815; G06F 3/065; G06F 8/70; G06F 9/30087; G06F 9/44505; H04L 67/10; H04L 2209/127; H04L 43/04; H04L 67/02; H04L 65/1069; H04L 63/08; H04L 63/102; H04L 67/1095; H04L 41/145; H04L 43/50; H04L 7/0012

USPC .................. 709/204, 220, 223, 230
See application file for complete search history.

(56) References Cited

U.S. PATENT DOCUMENTS

| | | | | |
|---|---|---|---|---|
| 5,117,422 A | * | 5/1992 | Hauptschein | H04L 45/00 370/255 |
| 5,802,528 A | * | 9/1998 | Oki | G06F 17/30575 |
| 6,047,323 A | * | 4/2000 | Krause | G06F 9/4426 709/201 |
| 6,167,433 A | * | 12/2000 | Maples | G06Q 10/10 709/204 |
| 6,629,081 B1 | * | 9/2003 | Cornelius | G06Q 20/04 705/30 |
| 6,694,335 B1 | * | 2/2004 | Hopmann | G06F 17/30581 707/624 |
| 7,069,234 B1 | * | 6/2006 | Cornelius | G06Q 20/10 705/26.35 |

(Continued)

*Primary Examiner* — Lan Dai T Truong
(74) *Attorney, Agent, or Firm* — Finnegan, Henderson, Farabow, Garrett & Dunner, LLP (57) ABSTRACT

This disclosure relates generally to computing platforms, and more particularly to a system and method for synchronizing computing platforms across technologies. In one embodiment, a method is provided for synchronizing a plurality of computing platforms. The method comprises gathering information on the plurality of computing platforms, performing a comparison among a set of computing platforms selected from the plurality of computing platforms based on the information gathered, providing at least one user selectable recommendation for synchronizing a computing platform selected from the set of computing platforms based on the comparison, and implementing the at least one recommendation on the computing platform upon selection by a user.

19 Claims, 5 Drawing Sheets

(56) References Cited

U.S. PATENT DOCUMENTS

| | | | | |
|---|---|---|---|---|
| 7,155,488 B1* | 12/2006 | Lunsford | | H04L 67/1095 |
| | | | | 709/216 |
| 7,167,844 B1* | 1/2007 | Leong | | G06Q 30/04 |
| | | | | 705/37 |
| 7,222,078 B2* | 5/2007 | Abelow | | G06Q 10/0639 |
| | | | | 705/1.1 |
| 7,293,040 B2 | 11/2007 | Terada | | |
| 7,610,233 B1* | 10/2009 | Leong | | G06Q 10/087 |
| | | | | 705/26.3 |
| 8,020,204 B2* | 9/2011 | Berger | | G06F 21/57 |
| | | | | 713/189 |
| 8,234,068 B1* | 7/2012 | Young | | G01C 21/00 |
| | | | | 244/175 |
| 8,301,994 B1* | 10/2012 | Shah | | G06F 17/30575 |
| | | | | 715/229 |
| 8,396,807 B1* | 3/2013 | Yemini | | G06Q 10/06 |
| | | | | 705/400 |
| 8,768,884 B2* | 7/2014 | Javalkar | | G06F 17/30581 |
| | | | | 707/611 |
| 8,776,230 B1* | 7/2014 | Singleton | | G06F 21/552 |
| | | | | 726/1 |
| 8,909,712 B2* | 12/2014 | Singh | | G06F 17/30575 |
| | | | | 709/206 |
| 9,026,619 B2* | 5/2015 | Lee | | H04L 12/2836 |
| | | | | 709/219 |
| 9,064,013 B1* | 6/2015 | Gay | | H04L 29/06 |
| 9,069,607 B1* | 6/2015 | Gopalakrishna Alevoor | | |
| | | | | G06F 9/45558 |
| 9,158,785 B1* | 10/2015 | Rudkowski | | H04L 67/1095 |
| 9,216,591 B1* | 12/2015 | Rozier | | G06F 3/1219 |
| 9,235,437 B2* | 1/2016 | Shanmugasundaram | | |
| | | | | G06F 9/465 |
| 9,342,325 B2* | 5/2016 | Barat | | G06F 9/44505 |
| 9,383,900 B2* | 7/2016 | Flores | | G06Q 10/0639 |
| 9,465,837 B1* | 10/2016 | Ross | | G06F 17/30424 |
| 9,495,188 B1* | 11/2016 | Ettema | | G06F 9/45533 |
| 9,608,931 B2* | 3/2017 | Sharma | | H04L 47/70 |
| 9,635,129 B2* | 4/2017 | Baldwin | | H04L 67/306 |
| 9,712,510 B2* | 7/2017 | Vinnik | | H04L 63/08 |
| 2003/0067489 A1* | 4/2003 | Candy Wong | | H04L 67/36 |
| | | | | 715/765 |
| 2003/0070061 A1* | 4/2003 | Wong | | G06F 8/38 |
| | | | | 712/220 |
| 2003/0172145 A1* | 9/2003 | Nguyen | | G06Q 10/10 |
| | | | | 709/223 |
| 2004/0045013 A1* | 3/2004 | Lam | | G06F 8/36 |
| | | | | 719/328 |
| 2004/0054610 A1* | 3/2004 | Amstutz | | G06Q 40/06 |
| | | | | 705/36 R |
| 2005/0015471 A1* | 1/2005 | Zhang | | H04L 63/0442 |
| | | | | 709/221 |
| 2005/0044187 A1* | 2/2005 | Jhaveri | | G06F 17/30206 |
| | | | | 709/219 |
| 2005/0044530 A1* | 2/2005 | Novik | | G06F 17/30174 |
| | | | | 717/122 |
| 2005/0185744 A1* | 8/2005 | Sato | | H04B 1/707 |
| | | | | 375/354 |
| 2005/0240354 A1* | 10/2005 | Mamou | | G06F 17/30563 |
| | | | | 702/19 |
| 2006/0010195 A1* | 1/2006 | Mamou | | G06Q 10/10 |
| | | | | 709/203 |
| 2006/0047974 A1* | 3/2006 | Alpern | | G06F 9/44521 |
| | | | | 713/191 |
| 2006/0171345 A1* | 8/2006 | Hildebrand | | H04B 7/2618 |
| | | | | 370/319 |
| 2006/0222163 A1* | 10/2006 | Bank | | G06F 17/30581 |
| | | | | 379/221.08 |
| 2007/0067349 A1* | 3/2007 | Jhaveri | | G06F 17/30206 |
| 2007/0128899 A1* | 6/2007 | Mayer | | G06F 9/4406 |
| | | | | 439/152 |
| 2007/0168874 A1* | 7/2007 | Kloeffer | | G06Q 10/06 |
| | | | | 715/764 |
| 2007/0226786 A1* | 9/2007 | Berger | | G06F 21/57 |
| | | | | 726/9 |
| 2007/0239700 A1* | 10/2007 | Ramachandran | | H04L 41/0813 |
| 2007/0244768 A1* | 10/2007 | Nguyen | | G06Q 30/06 |
| | | | | 705/26.81 |
| 2008/0109205 A1* | 5/2008 | Nasle | | G06F 17/5009 |
| | | | | 703/18 |
| 2008/0109466 A1* | 5/2008 | Havens | | G06F 9/45537 |
| 2008/0112439 A1* | 5/2008 | Vestal | | H04J 3/0661 |
| | | | | 370/516 |
| 2008/0177994 A1* | 7/2008 | Mayer | | G06F 9/4418 |
| | | | | 713/2 |
| 2008/0270363 A1* | 10/2008 | Hunt | | G06F 17/30489 |
| 2008/0294996 A1* | 11/2008 | Hunt | | G06Q 30/02 |
| | | | | 715/739 |
| 2009/0007219 A1* | 1/2009 | Abzarian | | G06F 21/577 |
| | | | | 726/1 |
| 2009/0037587 A1* | 2/2009 | Yoshimi | | H04L 63/045 |
| | | | | 709/227 |
| 2009/0106110 A1* | 4/2009 | Stannard | | G06F 17/30 |
| | | | | 705/14.1 |
| 2009/0158171 A1* | 6/2009 | Cheng | | A63F 13/12 |
| | | | | 715/753 |
| 2009/0196179 A1* | 8/2009 | Clark | | G06F 17/30174 |
| | | | | 370/235 |
| 2009/0201293 A1* | 8/2009 | Tung | | G06F 1/3203 |
| | | | | 345/440 |
| 2009/0240935 A1* | 9/2009 | Shukla | | G06F 9/44505 |
| | | | | 713/100 |
| 2009/0249359 A1* | 10/2009 | Caunter | | G06F 9/4448 |
| | | | | 719/315 |
| 2010/0070448 A1* | 3/2010 | Omoigui | | H01L 27/1463 |
| | | | | 706/47 |
| 2010/0083058 A1* | 4/2010 | Shufer | | G06F 11/1433 |
| | | | | 714/49 |
| 2010/0100706 A1* | 4/2010 | Inoue | | G06F 9/5077 |
| | | | | 712/30 |
| 2010/0115254 A1* | 5/2010 | Deng | | G06F 9/44505 |
| | | | | 713/1 |
| 2010/0223385 A1* | 9/2010 | Gulley | | G06F 9/5027 |
| | | | | 709/226 |
| 2010/0235829 A1* | 9/2010 | Shukla | | H04L 67/34 |
| | | | | 717/177 |
| 2010/0241962 A1* | 9/2010 | Peterson | | G06F 3/0481 |
| | | | | 715/720 |
| 2011/0047221 A1* | 2/2011 | Watanabe | | G06Q 10/10 |
| | | | | 709/206 |
| 2011/0047230 A1* | 2/2011 | McGee | | H04L 41/0609 |
| | | | | 709/206 |
| 2011/0067026 A1* | 3/2011 | Nishio | | G06F 21/31 |
| | | | | 718/100 |
| 2011/0083167 A1* | 4/2011 | Carpenter | | G06F 17/30563 |
| | | | | 726/4 |
| 2011/0093401 A1* | 4/2011 | Waite | | G06Q 30/014 |
| | | | | 705/303 |
| 2011/0125924 A1* | 5/2011 | McAleer | | H04L 67/1095 |
| | | | | 709/248 |
| 2011/0126275 A1* | 5/2011 | Anderson | | H04L 9/3213 |
| | | | | 726/8 |
| 2011/0145132 A1* | 6/2011 | Chien | | G06Q 30/08 |
| | | | | 705/37 |
| 2011/0145657 A1* | 6/2011 | Bishop | | G06F 11/3495 |
| | | | | 714/47.1 |
| 2011/0173302 A1* | 7/2011 | Rider | | G06F 9/44505 |
| | | | | 709/220 |
| 2011/0173303 A1* | 7/2011 | Rider | | G06F 9/44505 |
| | | | | 709/220 |
| 2011/0191417 A1* | 8/2011 | Rathod | | G06Q 30/02 |
| | | | | 709/204 |
| 2011/0231839 A1* | 9/2011 | Bennett | | G06F 9/45558 |
| | | | | 718/1 |
| 2011/0231865 A1* | 9/2011 | Dorn | | G06F 9/44 |
| | | | | 719/328 |
| 2011/0238755 A1* | 9/2011 | Khan | | G06Q 50/01 |
| | | | | 709/204 |

(56) References Cited

U.S. PATENT DOCUMENTS

| | | | |
|---|---|---|---|
| 2011/0258049 A1* | 10/2011 | Ramer | G06F 17/30867 705/14.66 |
| 2011/0276684 A1* | 11/2011 | Singh | G06F 9/4856 709/224 |
| 2011/0289489 A1* | 11/2011 | Kumar | G06F 11/3664 717/135 |
| 2011/0321025 A1* | 12/2011 | Challa | G06F 9/44505 717/169 |
| 2012/0069131 A1* | 3/2012 | Abelow | G06Q 10/067 348/14.01 |
| 2012/0084254 A1* | 4/2012 | Richards | G06F 9/541 707/609 |
| 2012/0123701 A1* | 5/2012 | Drueding | G01L 5/161 702/41 |
| 2012/0202525 A1* | 8/2012 | Pettini | H04W 4/043 455/456.3 |
| 2012/0254289 A1* | 10/2012 | Sathish | G06Q 30/0631 709/203 |
| 2012/0278519 A1* | 11/2012 | Angelotti | G06F 13/102 710/104 |
| 2012/0291048 A1* | 11/2012 | Bharadwaj | G06F 11/3414 719/318 |
| 2012/0331124 A1* | 12/2012 | Venkatesh | G06F 9/50 709/224 |
| 2013/0042034 A1* | 2/2013 | Mannava | G06F 9/522 710/61 |
| 2013/0073591 A1* | 3/2013 | Rolia | G06F 17/30964 707/777 |
| 2013/0124361 A1* | 5/2013 | Bryson | G06Q 30/0631 705/26.7 |
| 2013/0219043 A1* | 8/2013 | Steiner | G06F 9/4856 709/224 |
| 2013/0227675 A1* | 8/2013 | Fujioka | G06F 21/30 726/16 |
| 2013/0238786 A1* | 9/2013 | Khesin | H04L 67/34 709/224 |
| 2013/0275553 A1* | 10/2013 | Shilo | H04L 67/1095 709/217 |
| 2014/0129942 A1* | 5/2014 | Rathod | H04N 21/44222 715/720 |
| 2014/0136381 A1* | 5/2014 | Joseph | G06Q 40/02 705/35 |
| 2014/0146055 A1* | 5/2014 | Bala | G06F 11/1402 345/501 |
| 2014/0149494 A1* | 5/2014 | Markley | H04L 67/34 709/203 |
| 2014/0149983 A1* | 5/2014 | Bonilla | G06F 9/45558 718/1 |
| 2014/0164322 A1* | 6/2014 | Beaurepaire | G06F 17/30575 707/610 |
| 2014/0164700 A1* | 6/2014 | Liang | G06F 12/0806 711/119 |
| 2014/0171039 A1* | 6/2014 | Bjontegard | H04L 29/06034 455/414.1 |
| 2014/0195675 A1* | 7/2014 | Silver | H04L 65/1083 709/224 |
| 2014/0215471 A1* | 7/2014 | Cherkasova | G06F 11/3428 718/102 |
| 2014/0215506 A1* | 7/2014 | Kalmes | H04N 21/25841 725/14 |
| 2014/0236756 A1* | 8/2014 | Bourke | G06Q 30/0631 705/26.7 |
| 2014/0258412 A1* | 9/2014 | Li | H04L 67/34 709/204 |
| 2014/0280952 A1* | 9/2014 | Shear | H04L 47/70 709/226 |
| 2014/0282586 A1* | 9/2014 | Shear | G06F 9/5072 718/104 |
| 2014/0337825 A1* | 11/2014 | Challa | G06F 8/65 717/168 |
| 2014/0359129 A1* | 12/2014 | Sharma | H04L 47/70 709/226 |
| 2015/0012629 A1* | 1/2015 | Verma | H04L 67/10 709/223 |
| 2015/0082296 A1* | 3/2015 | Thomas | G06F 8/65 717/171 |
| 2015/0095137 A1* | 4/2015 | Savelli | G06Q 30/0242 705/14.41 |
| 2015/0095154 A1* | 4/2015 | Kannan | G06Q 30/0257 705/14.55 |
| 2015/0096011 A1* | 4/2015 | Watt | H04L 63/0272 726/15 |
| 2015/0100684 A1* | 4/2015 | Maes | G06F 11/3672 709/224 |
| 2015/0113131 A1* | 4/2015 | Veenstra | H04L 41/0803 709/224 |
| 2015/0127628 A1* | 5/2015 | Rathod | H04W 4/206 707/710 |
| 2015/0161632 A1* | 6/2015 | Humay | G06Q 30/0203 705/7.32 |
| 2015/0161644 A1* | 6/2015 | Bamane | G06Q 30/0226 705/14.27 |
| 2015/0170105 A1* | 6/2015 | Lim | G06Q 10/06 705/7.19 |
| 2015/0178135 A1* | 6/2015 | Wang | G06F 9/5027 718/104 |
| 2015/0199197 A1* | 7/2015 | Maes | G06F 8/71 717/122 |
| 2015/0220353 A1* | 8/2015 | Rothman | G06F 9/542 719/319 |
| 2015/0281336 A1* | 10/2015 | Beale | G06F 9/4856 709/201 |
| 2015/0304414 A1* | 10/2015 | Jasperson, Jr. | H04L 67/1023 709/202 |
| 2015/0358391 A1* | 12/2015 | Moon | H04L 67/10 709/224 |
| 2016/0033289 A1* | 2/2016 | Tuukkanen | G01C 21/3415 701/522 |
| 2016/0088109 A1* | 3/2016 | Chen | G06F 9/4843 709/203 |
| 2016/0094424 A1* | 3/2016 | Niestemski | H04L 41/0823 709/224 |
| 2016/0094483 A1* | 3/2016 | Johnston | H04L 47/827 709/226 |
| 2016/0171502 A1* | 6/2016 | Maenpaa | G06Q 20/32 705/44 |
| 2016/0210427 A1* | 7/2016 | Mynhier | G06F 19/345 |
| 2016/0219027 A1* | 7/2016 | Kaplan | H04L 63/08 |
| 2016/0267112 A1* | 9/2016 | Clissold | G06F 17/30309 |
| 2017/0006135 A1* | 1/2017 | Siebel | H04L 67/02 |
| 2017/0124457 A1* | 5/2017 | Jerram | G06N 5/02 |
| 2017/0213242 A1* | 7/2017 | Sundaram | G06Q 30/0246 |

\* cited by examiner

SYSTEM AND METHOD FOR SYNCHRONIZING COMPUTING PLATFORMS

PRIORITY CLAIM

This U.S. patent application claims priority under 35 U.S.C. § 119 to: Indian Application No. 1317/CHE/2015, filed on Mar. 18, 2015. The aforementioned application is incorporated herein by reference in its entirety.

TECHNICAL FIELD

This disclosure relates generally to computing platforms, and more particularly to a system and method for synchronizing computing platforms across technologies.

BACKGROUND

In the current business environment, effective application development, maintenance, and management are key factors in the success of many enterprises. Information Technology (IT) organizations typically strive to achieve effective delivery and management of their projects by implementing cloud based project solutions, such that each delivery of the project in an IT organization's portfolio is created, developed, organized and maintained on a platform hosted on the cloud services for easier and faster accessibility. These cloud based services may originate on different operating systems, different development platforms, and different technologies. Additionally, software developers have developed software tools that allow applications to run on multiple platforms. This has led to the increased development and usage of cross-platform software or multi-platform software.

However, currently there is no interface to enable users to efficiently work across multiple platforms or to efficiently switch from one platform to another. Therefore, the users need to manually compare and figure out the differences between the platforms and select one platform over the other for software application development, maintenance and management on the cloud. Further, when required, they manually migrate from one platform to another better platform. This results in loss of man-hours and increase in the maintenance cost. Further, the manual process is error prone leading to stability issues with cross platform integrations. In short, the current tools are costly, ineffective, and inefficient for software application development, maintenance and management on the cloud.

SUMMARY

In one embodiment, a method for synchronizing a plurality of computing platforms is disclosed. In one example, the method comprises gathering information on the plurality of computing platforms. The method further comprises performing a comparison among a set of computing platforms selected from the plurality of computing platforms based on the information gathered. The method further comprises providing at least one user selectable recommendation for synchronizing a computing platform selected from the set of computing platforms based on the comparison. The method further comprises implementing the at least one recommendation on the computing platform upon selection by a user.

In one embodiment, a system for synchronizing a plurality of computing platforms is disclosed. In one example, the system comprises at least one processor and a memory communicatively coupled to the at least one processor. The memory stores processor-executable instructions, which, on execution, cause the processor to gather information on the plurality of computing platforms. The processor-executable instructions, on execution, further cause the processor to perform a comparison among a set of computing platforms selected from the plurality of computing platforms based on the information gathered. The processor-executable instructions, on execution, further cause the processor to provide at least one user selectable recommendation for synchronizing a computing platform selected from the set of computing platforms based on the comparison. The processor-executable instructions, on execution, further cause the processor to implement the at least one recommendation on the computing platform upon selection by a user.

In one embodiment, a non-transitory computer-readable medium storing computer-executable instructions for synchronizing a plurality of computing platforms is disclosed. In one example, the stored instructions, when executed by a processor, cause the processor to perform operations comprising gathering information on the plurality of computing platforms. The operations further comprise performing a comparison among a set of computing platforms selected from the plurality of computing platforms based on the information gathered. The operations further comprise providing at least one user selectable recommendation for synchronizing a computing platform selected from the set of computing platforms based on the comparison. The operations further comprise implementing the at least one recommendation on the computing platform upon selection by a user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
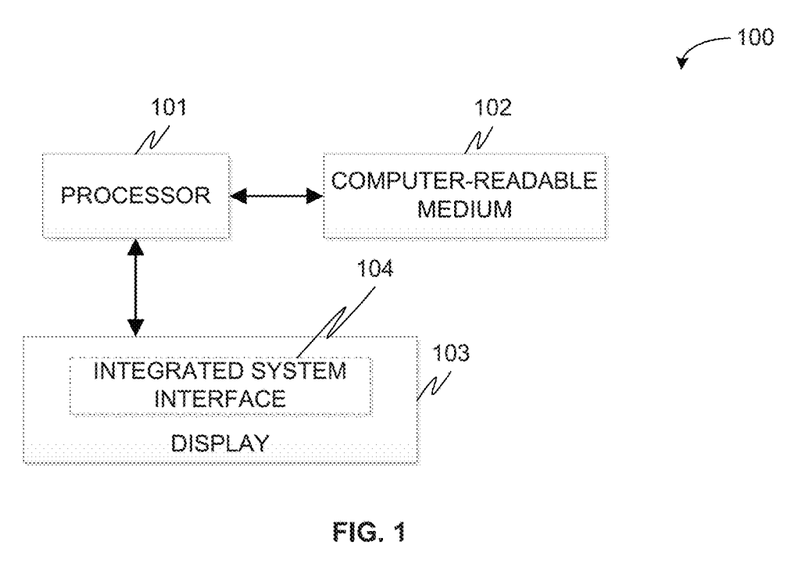
FIG. 1 is a block diagram of an exemplary system for synchronizing computing platforms in accordance with some embodiments of the present disclosure.

Referring now to FIG. 1, an exemplary system 100 for synchronizing computing platforms is illustrated in accordance with some embodiments of the present disclosure. In particular, the system 100 implements a synchronization platform for synchronizing computing platforms (e.g., software application management platforms) across technologies. In other words, the synchronization platform communicatively connects to the multiple computing platforms, compares the features, and provides suggestions for implementation of any new feature, up gradation of any feature, or any other technical improvements. The system 100 comprises one or more processors 101, a computer-readable medium (e.g., a memory) 102, and a display 103. The computer-readable medium 102 stores instructions that, when executed by the one or more processors 101, cause the one or more processors 101 to perform synchronization of computing platforms in accordance with aspects of the present disclosure. The system 100 interacts with users via an integrated system interface 104 accessible to the users via the display 103.

Figure 2:
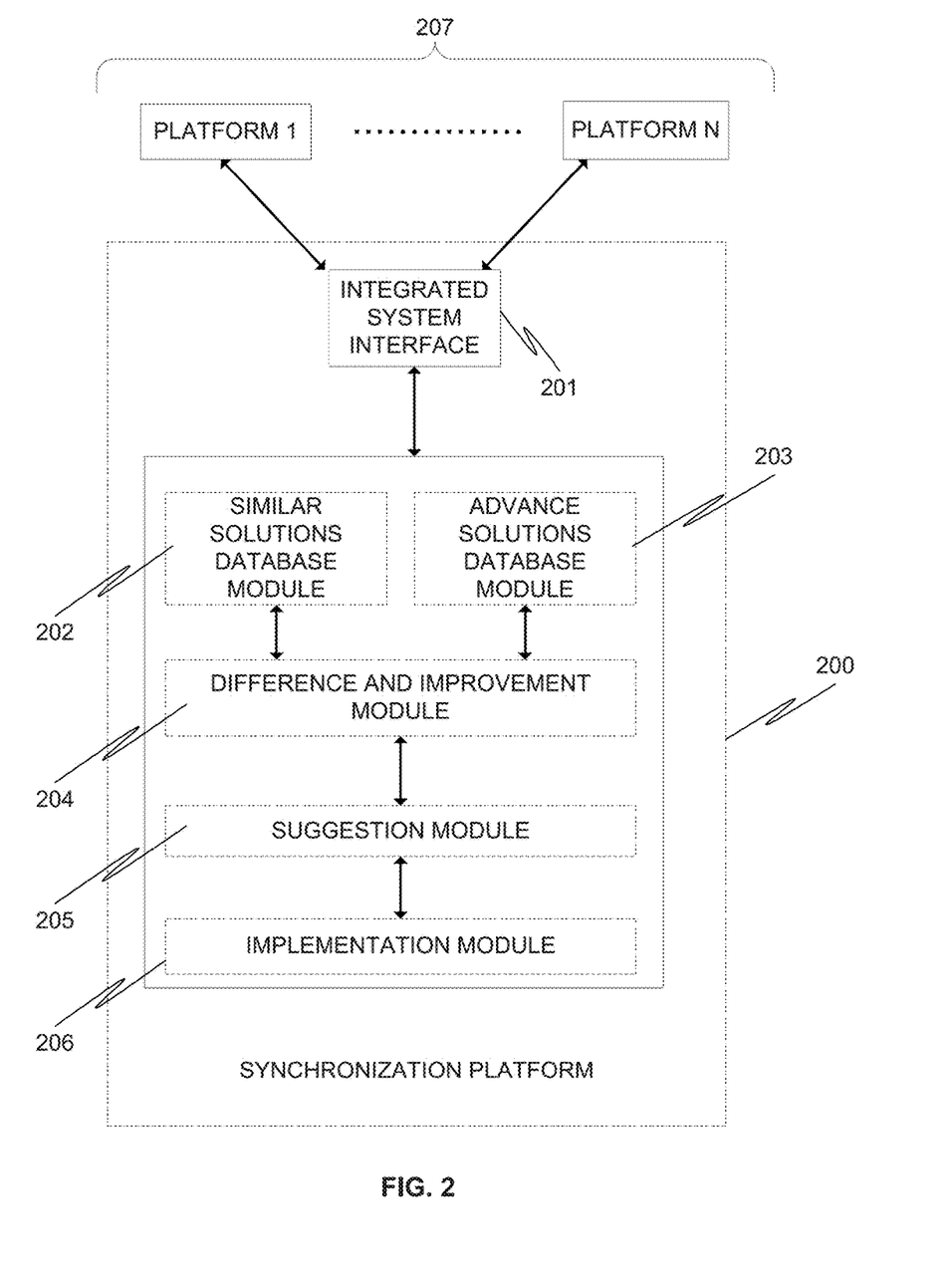
FIG. 2 is a functional block diagram of synchronization platform in accordance with some embodiments of the present disclosure.

Referring now to FIG. 2, a functional block diagram of the synchronization platform 200 implemented by the system 100 of FIG. 1 is illustrated in accordance with some embodiments of the present disclosure. In some embodiments, synchronization platform 200 comprises an integrated system interface (ISI) 201, a similar solutions database module 202, an advance solutions database module 203, a difference and improvement module 204, a suggestion module 205, and an implementation module 206.

The ISI 201 integrates two or more computing platforms 207 (individually named as Platform 1 . . . Platform N) with the synchronization platform 200. The ISI 201 is also configured to create backups for all activities performed on each of the plurality of computing platforms 207. In an embodiment, each of the computing platforms 207 may provide an Application Programming Interface (API). The ISI 201 may use these APIs to connect, interact, and integrate the two or more computing platforms 207. Each of the computing platforms 207 are configured to provide a pre-existing environment for one or more software applications. The software applications are designed to run within a host computing platform, obey one or more constraints of the host computing platform, use one or more facilities provided by the host computing platform, and so forth. Further, the two or more computing platforms 207 may be the existing platforms used by the project users for development or testing activities. Some examples of computing platforms 207 include, but are not limited to, an Application Lifecycle Management (ALM) platform used for software development from requirement management to testing, an IT Service Management (ITSM) platform for incident management and problem management, a release management platform where build scripts are triggered based on different workflows, and so forth. Each of these platforms may be built using different technologies; for example, Microsoft™ TFS build engine is based on .Net and Azure technologies.

Further, the ISI 201 is adapted to gather information on the two or more computing platforms 207. In some embodiment, gathering information on computing platforms 207 comprises gathering information on one or more features of each of the two or more computing platforms 207. Further, the ISI 201 is configured to gather information on one or more substantially similar features across the two or more computing platforms 207, and share this information with the similar solutions database module 202. Moreover, the ISI 201 is configured to gather information on one or more substantially advance features across the two or more computing platforms 207, and share this information with the advance solutions database module 203. The ISI 201 may also update the difference and improvement module 204 with differences between the two or more computing platforms 207. Additionally, the ISI 201 may update the implementation module 206 with the information required to implement a solution based on the differences so as to achieve synchronization between the computing platforms.

The similar solutions database module 202 collects the information about substantially similar tool sets across platforms from the ISI 201. In some embodiments, the similar solutions database module 202 clubs open source software configuration management tool sets as similar tool sets. Further, in some embodiments, the similar solutions database module 202 clubs tool sets from a specific vendor as similar tool sets. Yet further, in some embodiments, the similar solutions database module 202 clubs tool sets with similar features as similar tool sets. For example, for application lifecycle management (ALM) platform, ALM tool sets from different vendors may be clubbed together as similar tool sets, such as IBM™ Rational® Jazz™ platform, Microsoft™ Team Foundation Server (TFS), HP® ALM, and so forth. Further, for release management platform, tool sets such as Jenkins (an open source tool), Microsoft™ TFS build engine, IBM™ Jazz™ build engine, and so forth may be clubbed together as similar tool sets. Moreover, for IT Service Management (ITSM) platform, tool sets such as homegrown ITSM tools, BMC™ Remedy ITSM or ServiceNOW™ ITSM may be clubbed together as similar tool sets. Further, in some embodiments, similar tool sets may be for static code analysis and may include Checkstyle, PMD, FindBugs™, Microsoft™ Fxcop, and so forth.

The advance solutions database module 203 collects the information about substantially advance tool sets across platforms from the ISI 201. For example, the advance tool sets may include tool sets that provide additional features/functions in addition to software configuration management. Another example of the advance tool sets may be static code analysis tools integrated as a component into a release management platform or an ALM platform. Yet another example of the advance tool sets is configuration management tools (such as SVN, GIT and TFS) integrated as a component into an ALM platform.

The difference and improvement module 204 is configured to compare among a set of computing platforms selected from the two or more computing platforms 207 based on the information gathered by the ISI 201. The difference and improvement module 204 is further configured to compare one or more corresponding features of each of the set of computing platforms. Yet further, the difference and improvement module 204 is configured to determine and analyze differences among the set of computing platforms as provided by the ISI 201, and then update a first repository residing within the synchronization platform 200 with the differences among the set of computing platforms based on the comparison. For example, a comparison between IBM™ Jazz™ based ALM platform and Microsoft TFS™ may determine that TFS™ has an additional inbuilt integration release management. Another example includes a comparison between IBM™ Jazz™ based ALM platform and Microsoft Azure™ to determine that Azure™ is available on a pay per use mode.

The suggestion module 205 is configured to provide one or more user selectable recommendations for synchronizing a computing platform selected from the set of computing platforms based on the comparison. The one or more recommendations comprise a solution for implementing one or more new or missing features on the computing platform or upgrading one or more features on the computing platform. For example, a recommendation to the user based on the current usage (e.g., configuration management or build automation, etc.) may be other available features on the platform that may be leveraged. The suggestion module 205 is further configured to update a second repository residing within the synchronization platform 200 with the solutions based on the implementation.

The implementation module 206 is configured to implement the one or more recommendations selected by a user. In an alternate embodiment, the implementation module 206 automatically implements the one or more recommendations.

In one embodiment, a user launches the synchronization platform 200 from the web browser or other interfaces. Upon launch, the ISI 201 integrates and analyzes all the currently employed different platforms on the user machine. The ISI 201 may also display and present a list of currently employed platforms to the user. In some embodiments, the user is provided with options and suggestions regarding which platform to select. For example, a source configuration platform or a performance analysis platform and so forth. Thereafter, the user selects the required recommendations and suggestions for the selected platform from the ISI 201. Upon selection of the platform by the user, the improvement and differences module 204 is triggered. The difference and improvement module 204 then compares the currently used platforms on the user machine with the data from the similar solutions database module 202 and the advance solutions database module 203. Based on the comparison performed by the difference and improvement module 204, the suggestion module 205 provides recommendations to the user. The recommendations include features missing in currently used platforms as compared to other available advance platforms (information provided by the advance solutions database module 203). Further, the recommendations include more advance features on other available similar platforms (information provided by the similar solutions database module 202). Thereafter, the user selects one or more required recommendations. Finally, the implementation module 206 is triggered to implement the one or more required recommendations and provide the additional features to the user.

However, if the user does not select any recommendation provided by the suggestion module 205, then the information from the currently used platforms on the user machine is copied into the synchronization platform 200 and the currently used platforms are executed independently. It should be noted that the synchronization platform 200 also collects and stores the features of currently used platforms on the user machine. The collected features may be stored in one or both of the similar solutions database module 202 and the advance solutions database module 203.

In a further embodiment, a new platform is integrated with the synchronization platform 200 by migrating information from the new platform to the ISI 201. In an embodiment, the ISI 201 may be notified whenever the new platform is included in the two or more computing platforms 207. Then, the ISI 201 may start storing all changes to the new platform. Next, the ISI 201 may display the feature comparison of the new platform with the data from the similar solutions database module 202 and the advance solutions database module 203. Subsequently, the recommendations from the suggestion module 205 may be displayed and presented to the user.

Thereafter, it is determined whether the new platform is required to implement the recommendations. If the recommendations need to be implemented, then the implementation module 206 implements an algorithm on the new platform accordingly. However, if the recommendations need not to be implemented, it is further determined whether the new platform is required to be migrated to an advance platform. If the new platform is required to be migrated, then the implementation module 206 generates an algorithm to migrate the new platform to the advance platform having the required features. However, if the same platform is to be continued by the new platform, then the ISI 201 makes a copy of the changes on the new platform for future migration needs. Thereafter, it is further determined if an advance platform corresponding to the new platform is available. In case, the advance platform is available, then the data from the ISI 201 is migrated to the advance platform.

Based on the above operational procedure, technology independent solutions may be built for suggestions and migrations. It may be noted that the difference and improvement module 204 is continuously updated based on the comparisons of different platforms. The suggestion module 205 is also updated as and when new platforms are added to the synchronization platform 200.

Further, it should be noted that the synchronization platform may be implemented in programmable hardware devices such as programmable gate arrays, programmable array logic, programmable logic devices, and so forth. Alternatively, the synchronization platform may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for synchronizing computing platforms. For example, the exemplary system 100 and the associated synchronization platform 200 may manage synchronization of computing platforms by the processes discussed herein. In particular, as will be appreciated by those of ordinary skill in the art, control logic and/or automated routines for performing the techniques and steps described herein may be implemented by the system 100 and the associated synchronization platform 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3A:
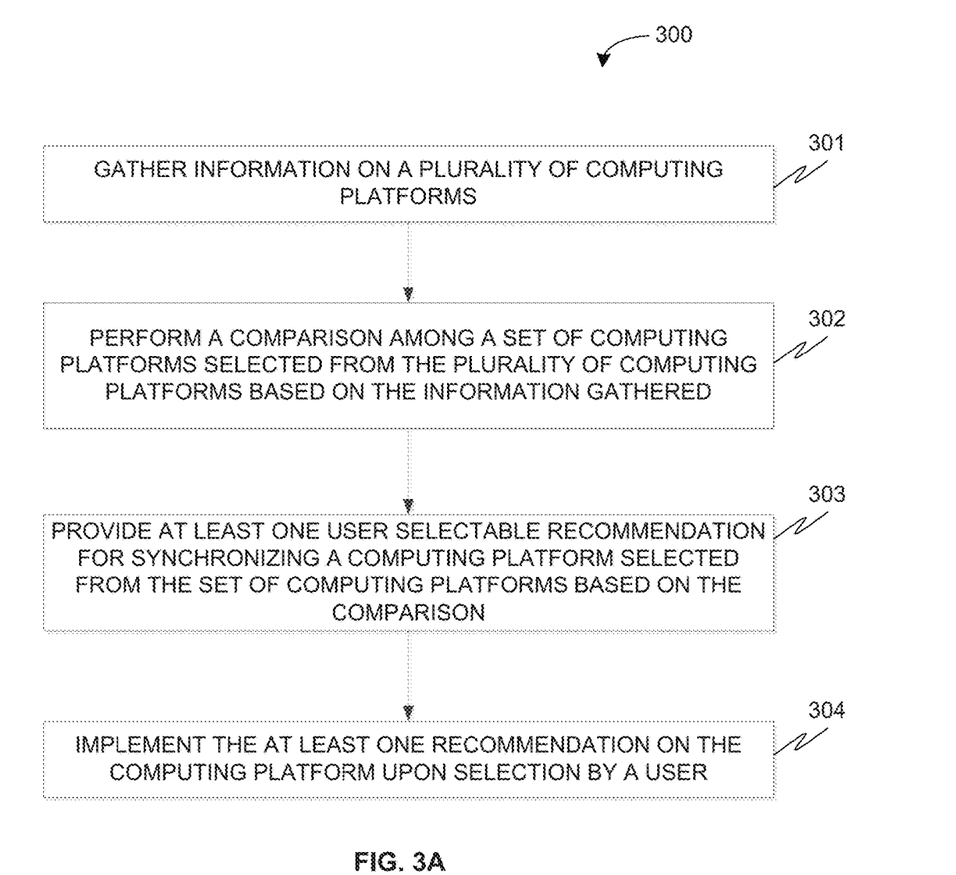
FIG. 3A is a flow diagram of an exemplary process for synchronizing computing platforms in accordance with some embodiments of the present disclosure.

For example, referring now to FIG. 3A, exemplary control logic 300 for synchronizing a plurality of computing platforms via a system, such as system 100, is depicted via a flowchart in accordance with some embodiments of the present disclosure. As illustrated in the flowchart, the control logic 300 includes the steps of gathering information on the plurality of computing platforms at step 301, performing a comparison among a set of computing platform selected from the plurality of computing platforms based on the information gathered at step 302, providing at least one user selectable recommendation for synchronizing a computing platform selected from the set of computing platforms based on the comparison at step 303, and implementing the at least one recommendation on the computing platform upon selection by a user at step 304.

Figure 3B:
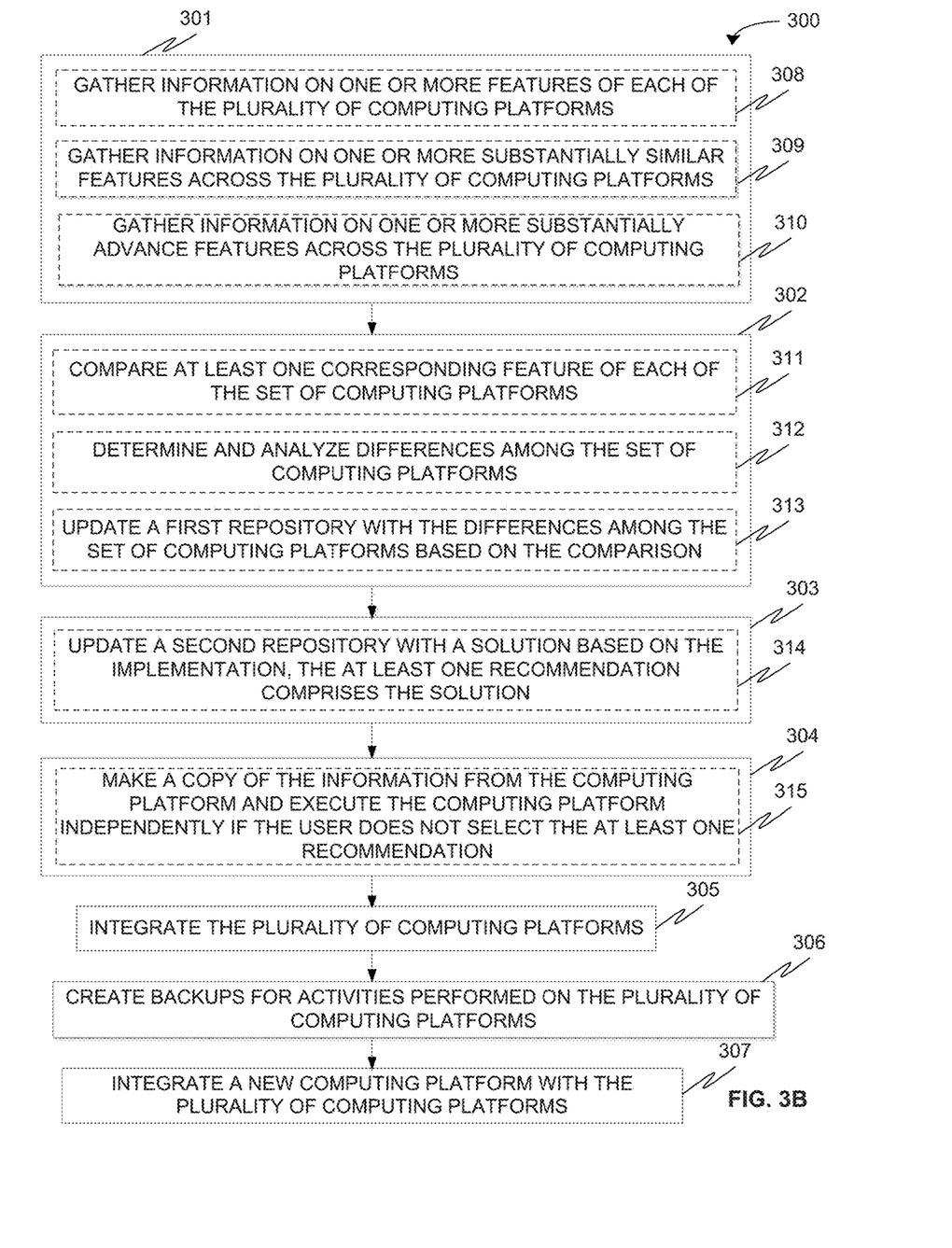
FIG. 3B is a flow diagram of a detailed exemplary process for synchronizing computing platforms in accordance with some embodiments of the present disclosure.

Referring now to FIG. 3B, the control logic 300 is depicted in greater detail via a flowchart in accordance with some embodiments of the present disclosure. In some embodiments, the control logic 300 may further include the step of integrating the plurality of computing platforms at step 305. Further, the control logic 300 may include the step of creating backups for activities performed on the plurality of computing platforms at step 306. It should be noted that, in some embodiments, the control logic 300 also comprises the step of integrating a new platform with the plurality of computing platforms by migrating information from the new platform to an integrated system interface at step 307.

In some embodiments, gathering information at step 301 further comprises gathering information on one or more features of each of the plurality of computing platforms at step 308. Additionally, gathering information at step 301 may further comprise gathering information on one or more substantially similar features across the plurality of computing platforms at step 309 or gathering information on one or more substantially advance features across the plurality of computing platforms at step 310 or both.

In some embodiments, performing the comparison at step 302 further comprises comparing at least one corresponding feature of each of the set of computing platforms at step 311, determining and analyzing differences among the set of computing platforms at step 312, and updating a first repository with the differences among the set of computing platforms based on the comparison at step 313.

In some embodiments, providing at least one recommendation at step 303 further comprises updating a second repository with a solution based on the implementation at step 314, wherein the at least one recommendation comprise the solution for implementing one or more new or missing features on the computing platform or upgrading one or more features on the computing platform.

Finally, in some embodiments, the control logic 300 may further include the step of making a copy of the information from the computing platform and executing the computing platform independently at step 315 if the user does not select the at least one recommendation at step 304.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 4:
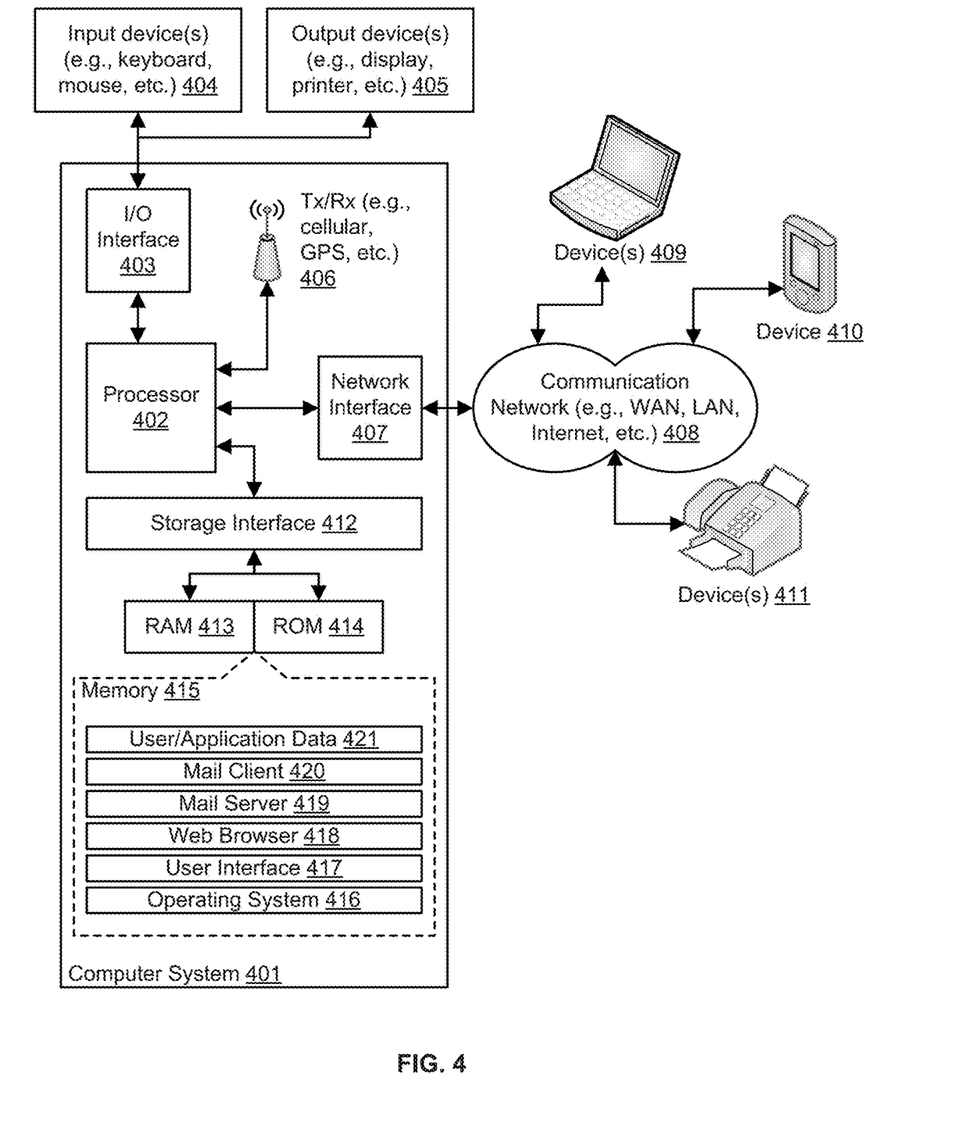
FIG. 4 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 4, a block diagram of an exemplary computer system 401 for implementing embodiments consistent with the present disclosure is illustrated. Variations of computer system 401 may be used for implementing system 100 and synchronization platform 200 for synchronizing computing platforms such as software application management platforms. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., similar features, advance features, differences among computing platforms, recommendations and solutions, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above results in efficient and effective synchronization of software application management platforms across technologies. Conventional synchronization of software application management platforms requires error prone manual effort. The synchronization platform described in the embodiments discussed above automates the process of comparison among multiple platforms, analyzes differences among the platforms, maintains latest copy from all the platforms, provides suggestions for improvement for one or more of the platforms, provides readily available solutions for implementation on one or more of the platforms, and removes platform dependency when needed using a low lying integrated interface.

Additionally, the various embodiments described above provide a single integrated interface, which keeps track of all deliveries on any used platform, so the platform may be easily migrated to another platform at any given point in time. Further, as will be appreciated by those skilled in the art, the synchronization platform described above helps in reducing efforts and increases stability in cross platform integration as it automates the process to determine the differences, to compare among similar platforms, and if already using a particular platform, to migrate to another better platforms.

The specification has described system and method for synchronizing software application management platforms. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for synchronizing a plurality of computing platforms, the method comprising:
    gathering, via a computer processor, information on the plurality of computing platforms;
    performing, via the computer processor, a comparison among a set of computing platforms selected from the plurality of computing platforms based on the information gathered;
    providing, via the computer processor, at least one user-selectable recommendation for synchronizing a computing platform selected from the set of computing platforms based on the comparison;
    receiving a selection by a user of at least one recommendation for synchronizing the computing platform; and
    implementing, via the computer processor, the at least one recommendation selected by the user for synchronizing the computing platform,
    wherein each of the plurality of computing platforms is configured to provide a preexisting environment for at least one software application, and
    wherein the at least one software application is designed to run within a host computing platform, obey at least one constraint of the host computing platform, and use at least one facility provided by the host computing platform.

2. The method of claim 1, wherein gathering information comprises at least one of gathering information on one or more features of each of the plurality of computing platforms, gathering information on one or more substantially similar features across the plurality of computing platforms, and gathering information on one or more substantially advance features across the plurality of computing platforms.

3. The method of claim 1, wherein performing the comparison comprises comparing at least one corresponding feature of each of the set of computing platforms.

4. The method of claim 1, wherein performing the comparison comprises determining and analyzing differences among the set of computing platforms.

5. The method of claim 4, further comprising updating a first repository with the differences among the set of computing platforms based on the comparison.

6. The method of claim 1, wherein the at least one recommendation comprises a solution for implementing at least one new or missing feature on the computing platform or upgrading at least one feature on the computing platform.

7. The method of claim 6, further comprising updating a second repository with the solution based on the implementation.

8. The method of claim 1, further comprising making a copy of the information from the computing platform and executing the computing platform independently if the user does not select the at least one recommendation.

9. The method of claim 1, further comprising at least one of integrating the plurality of computing platforms, and creating backups for activities performed on the plurality of computing platforms.

10. The method of claim 1, further comprising integrating, via the computer processor, a new computing platform with the plurality of computing platforms by migrating information from the new platform to an integrated system interface.

11. The method of claim 1, wherein the computing platform is used by the user for at least one of a testing activity and a development activity.

12. A system for synchronizing a plurality of computing platforms, the system comprising:
    at least one computer processor; and
    a computer-readable medium storing instructions that, when executed by the at least one computer processor, cause the at least one computer processor to perform operations comprising:
        gathering information on the plurality of computing platforms;
        performing a comparison among a set of computing platforms selected from the plurality of computing platforms based on the information gathered;
        providing at least one user-selectable recommendation for synchronizing a computing platform selected from the set of computing platforms based on the comparison;
        receiving a selection by a user of at least one recommendation for synchronizing the computing platform; and
        implementing the at least one recommendation selected by the user for synchronizing the computing platform,
        wherein each of the plurality of computing platforms is configured to provide a preexisting environment for at least one software application, and
        wherein the at least one software application is designed to run within a host computing platform, obey at least one constraint of the host computing platform, and use at least one facility provided by the host computing platform.

13. The system of claim 12, wherein gathering information comprises at least one of gathering information on one or more features of each of the plurality of computing platforms, gathering information on one or more substantially similar features across the plurality of computing platforms, and gathering information on one or more substantially advance features across the plurality of computing platforms.

14. The system of claim 12, wherein performing the comparison comprises at least one of comparing at least one corresponding feature of each of the set of computing platforms and determining and analyzing differences among the set of computing platform.

15. The system of claim 12, wherein the at least one recommendation comprises a solution for implementing at least one new or missing feature on the computing platform or upgrading at least one feature on the computing platform.

16. The system of claim 12, wherein the operations further comprise making a copy of the information from the computing platform and executing the computing platform independently if the user does not select the at least one recommendation.

17. The system of claim 12, wherein the operations further comprise at least one of integrating the plurality of computing platforms, and creating backups for activities performed on the plurality of computing platforms.

18. The system of claim 12, wherein the operations further comprise integrating a new computing platform with the plurality of computing platforms by migrating information from the new platform to an integrated system interface.

19. A non-transitory computer-readable medium storing computer-executable instructions that, when processed by a computer processor, cause the computer processor to perform a method, the method comprising:
   gathering information on a plurality of computing platforms;
   performing a comparison among a set of computing platforms selected from the plurality of computing platforms based on the information gathered;
   providing at least one user-selectable recommendation for synchronizing a computing platform selected from the set of computing platforms based on the comparison;
   receiving a selection by a user of at least one recommendation for synchronizing the computing platform; and
   implementing the at least one recommendation selected by the user for synchronizing the computing platform,
   wherein each of the plurality of computing platforms is configured to provide a preexisting environment for at least one software application, and
   wherein the at least one software application is designed to run within a host computing platform, obey at least one constraint of the host computing platform, and use at least one facility provided by the host computing platform.

* * * * *